United States Patent
Kadowaki

(10) Patent No.: US 12,411,581 B2
(45) Date of Patent: *Sep. 9, 2025

(54) COVER FILM FOR PEN SENSOR AND PEN SENSOR

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,793

(22) Filed: Jul. 9, 2024

(65) Prior Publication Data

US 2024/0361868 A1    Oct. 31, 2024

Related U.S. Application Data

(63) Continuation of application No. 18/452,453, filed on Aug. 18, 2023, now Pat. No. 12,073,047, which is a (Continued)

(30) Foreign Application Priority Data

Aug. 25, 2020 (JP) ................. 2020-141554

(51) Int. Cl.
*G06F 3/044* (2006.01)
*G06F 3/0354* (2013.01)
(Continued)

(52) U.S. Cl.
CPC ........ *G06F 3/0442* (2019.05); *G06F 3/03545* (2013.01); *H01B 1/02* (2013.01); *H01B 1/128* (2013.01); *H01B 5/14* (2013.01)

(58) Field of Classification Search
CPC ..... G06F 3/03545; G06F 3/0442; H01B 1/02; H01B 1/128; H01B 5/14
See application file for complete search history.

(56) References Cited

U.S. PATENT DOCUMENTS 9,569,038 B2    2/2017    Doi et al.
10,401,985 B2    9/2019    Hara et al.
(Continued)

FOREIGN PATENT DOCUMENTS

JP    2011034708 A    2/2011
JP    2011222013 A    11/2011
(Continued)

OTHER PUBLICATIONS

Fuji-Kogyou Co., Ltd., "For Those Who Are Searching With Keywords Conductive Resin and Transparent," URL=https://jushikakou-support.com/index_s_jushi_005.html, retrieved Feb. 16, 2023. (6 pages) (with machine translation).

(Continued)

*Primary Examiner* — Michael Pervan
(74) *Attorney, Agent, or Firm* — Seed Intellectual Property Law Group LLP

(57) ABSTRACT

A cover film used together with a pen sensor including a plurality of sensor electrodes, and a sensor controller which detects a position of an active pen in reference to a distribution of signal levels each corresponding to an amount of electric charge induced in an individual one of the plurality of sensor electrodes by a pen signal transmitted from a pen tip electrode disposed at a tip of the active pen. The cover film includes a conductive resin that covers an effective area formed by the sensor electrodes for detection of the position of the active pen and that includes a substantially uniform resistance component at least within a range of the effective area. The cover film is arranged, without via a cover glass, on an upper surface of a sensor electrode group including the plurality of sensor electrodes.

11 Claims, 8 Drawing Sheets

Related U.S. Application Data continuation of application No. 18/173,597, filed on Feb. 23, 2023, now Pat. No. 11,768,565, which is a continuation of application No. PCT/JP2021/026440, filed on Jul. 14, 2021.

(51) Int. Cl.
*H01B 1/02* (2006.01)
*H01B 1/12* (2006.01)
*H01B 5/14* (2006.01)

(56) References Cited

U.S. PATENT DOCUMENTS

| | | |
|---|---|---|
| 10,759,917 B2 | 9/2020 | Murakami |
| 2012/0075243 A1 | 3/2012 | Doi et al. |
| 2018/0046272 A1 | 2/2018 | Hara et al. |
| 2019/0248974 A1 | 8/2019 | Murakami |
| 2022/0334661 A1 | 10/2022 | Barel |

FOREIGN PATENT DOCUMENTS

| | | |
|---|---|---|
| JP | 2015052861 A | 3/2015 |
| JP | 5924831 B1 | 5/2016 |
| JP | 2018195854 A | 12/2018 |
| JP | 2019064739 A | 4/2019 |
| JP | 6537759 B1 | 7/2019 |
| JP | 2019136882 A | 8/2019 |
| KR | 20140136334 A | 11/2014 |
| WO | WO 2016186191 A1 | 11/2016 |
| WO | WO 2018016442 A1 | 1/2018 |
| WO | WO 2021187575 A1 | 9/2021 |

OTHER PUBLICATIONS

International Search Report, mailed Sep. 7, 2021, for International Patent Application No. PCT/JP2021/026440. (4 pages) (with English translation).

Nagaoka Sangyou Co., Ltd., "Introduction of Transparent Conductive Film, Staclear (Registered Trademark)," URL=https://www.nagaoka-sangyou.jp/pdf/staclear_proposal.pdf, retrieved Jan. 10, 2023. (34 pages) (with English translation).

Toyo Jushi Co., Ltd, "Conductive plastic molding technology" URL=http://web.archive.org/web/20211027195517/http://www.toyojushi.co.jp/realfab/tech-org/to_conductive, retrieved Feb. 16, 2023. (2 pages) (with English translation).

COVER FILM FOR PEN SENSOR AND PEN SENSOR

BACKGROUND

Technical Field

The present disclosure relates to a cover film for a pen sensor and a pen sensor.

Description of the Related Art

Electronic devices that enable pen input by deriving the position of an active pen on a panel surface are known. This type of electronic device includes a sensor (hereinafter referred to as a "pen sensor") for detecting a pen signal transmitted from an active pen within a panel surface. Each of Patent Documents 1 and 2 discloses an example of the electronic device including the pen sensor.

Both of the pen sensors described in Patent Documents 1 and 2 include a plurality of sensor electrodes. Patent Document 1 discloses that the position of an active pen is derived from the distribution of signal levels each corresponding to the amount of electric charge induced in an individual one of the plurality of sensor electrodes. Further, Patent Document 2 discloses a configuration in which the plurality of sensor electrodes are simultaneously selected and used for receiving a pen signal.

FIG. 8A is a diagram illustrating an example of a configuration of an electronic device including a pen sensor according to the background art. An electronic device 100 according to this example has a structure in which a display 101, a sensor electrode group 102, and a cover glass 103 are stacked in this order. An upper surface of the cover glass 103 constitutes a panel surface 100a. The individual layers adhere to each other by respective adhesive layers. The display 101 is, for example, a liquid crystal display or an organic EL (Electroluminescence) display. Further, the sensor electrode group 102 includes a metal mesh or substantially transparent linear conductors such as ITO (Indium Tin Oxide).

Further, FIG. 8B is a diagram illustrating another example of the configuration of the electronic device including the pen sensor according to the background art. An electronic device 110 according to this example has a structure in which a sensor electrode group and display 111 and a cover film 112 adhere to each other by an adhesive layer. An upper surface of the cover film 112 constitutes a panel surface 110a. The reason why the cover film 112 is used instead of the cover glass 103 is to realize what is generally called a "flexible display" as well as to reduce the height. The sensor electrode group and display 111 is a device in which a sensor electrode group for detecting an active pen and an electrode group (pixel electrodes and common electrodes) constituting a display are integrated with each other and is called an in-cell type or an on-cell type due to its specific structure. Patent Document 3 discloses an example of a sensor electrode group and display of the on-cell type.

Additionally, Patent Documents 4 to 8 and Non-Patent Document 1 disclose examples of conductive films that are conductive film-like members. Non-Patent Document 2 discloses coating with a conductive resin. Non-Patent Document 3 discloses a technique for molding a conductive plastic having a wide range of conductive and antistatic properties.

PRIOR ART DOCUMENTS

Patent Documents

Patent Document 1: Japanese Patent No. 6537759
Patent Document 2: Japanese Patent No. 5924831
Patent Document 3: Japanese Patent Laid-Open No. 2011-222013
Patent Document 4: PCT Patent Publication No. WO2018/016442
Patent Document 5: Japanese Patent Laid-Open No. 2018-195854
Patent Document 6: Japanese Patent Laid-Open No. 2019-064739
Patent Document 7: Japanese Patent Laid-Open No. 2019-136882
Patent Document 8: Japanese Patent Laid-Open No. 2011-034708

Non-Patent Documents

Non-Patent Document 1: Nagaoka Sangyou Co., Ltd., "Introduction of Transparent Conductive Film, Staclear (Registered Trademark)," [online], [retrieved on Aug. 21, 2020], Internet, <URL: "https://www.nagaoka-sangyou.jp/pdf/staclear_proposal.pdf">
Non-Patent Document 2: Fuji-Kogyou Co., Ltd., "For Those Who Are Searching With Keywords Conductive Resin and Transparent.," [online], [retrieved on Aug. 21, 2020], Internet, <URL: "https://jushikakou-support.com/index_s_jushi_005.html">
Non-Patent Document 3: TOYOJYUSHI Corporation, "Conductive Plastic Molding Technology," [online], [retrieved on Aug. 21, 2020], Internet, <URL: http://www-.toyojushi.co.jp/realfab/tech-org/to_conductive>

BRIEF SUMMARY

Technical Problem

FIG. 9 is a diagram illustrating equivalent circuits of an electronic device and an active pen according to the background art. An electronic device 120 illustrated in FIG. 9 includes a sensor controller 123 in addition to a sensor electrode group 121 and a display 122. The sensor controller 123 is an integrated circuit that derives the position of the active pen P on a panel surface by receiving a pen signal transmitted from the active pen P via the sensor electrode group 121.

FIG. 9 also illustrates virtual capacitances $C_{pen}$, $C_{disp}$, and $C_{sys\_GND}$ formed between respective units. The capacitance $C_{pen}$ is a capacitance formed between the active pen P and the sensor electrode group 121. The capacitance $C_{disp}$ is a capacitance formed between the sensor electrode group 121 and the display 122. The capacitance $C_{sys\_GND}$ is a capacitance formed between the electronic device 120 and a ground terminal. Among them, a capacitance value of the capacitance $C_{pen}$ is determined depending on the thickness and relative permittivity of non-conductive substances which are positioned between the active pen P and the sensor electrode group 121, such as the cover glass 103, the cover film 112, and the adhesive layers illustrated in FIGS. 8A and 8B, the distance between a pen tip electrode of the active pen P and the sensor electrode group 121, and the like. Further, the capacitance $C_{disp}$ increases as the distance between the sensor electrode group 121 and the display 122 decreases. The capacitance $C_{disp}$ becomes a significantly large value especially when the sensor electrode group and display 111 illustrated in FIG. 8(*b*) is used.

Here, the cover film 112 as illustrated in FIG. 8B is typically thinner and has a smaller relative permittivity than the cover glass 103 illustrated in FIG. 8A. A larger capacitance $C_{pen}$ is more preferable, and decreasing the distance between the active pen P and the sensor electrode group 121 with use of the thin cover film 112 is a factor that increases the capacitance $C_{pen}$. Meanwhile, a ratio of the capacitance $C_{pen}$ formed between a sensor electrode (hereinafter referred to as a "central sensor electrode") positioned immediately below the active pen and the active pen and the capacitance $C_{pen}$ formed between a sensor electrode (hereinafter referred to as a "peripheral sensor electrode") positioned near the central sensor electrode and the active pen P increases. Further, a small relative permittivity is a factor that decreases the capacitance $C_{pen}$. In addition, as the capacitance $C_{disp}$ increases, a display noise flowing into the sensor controller 123 increases, deteriorating the S/N (Signal-to-Noise) ratio of the pen signal. As a result, the example of FIG. 8B has a problem that receiving the pen signal at peripheral sensor electrodes is difficult as compared with the example of FIG. 8A.

Accordingly, one of objects of the present disclosure is to provide a cover film for a pen sensor and a pen sensor that can sufficiently receive a pen signal at peripheral sensor electrodes even when the cover film that is thinner and has a smaller relative permittivity than a cover glass is used.

Technical Solution

A cover film according to the present disclosure is used together with a pen sensor including a plurality of sensor electrodes, and a sensor controller that, in operation, detects a position of a pen in reference to a distribution of signal levels each corresponding to an amount of electric charge induced in an individual one of the plurality of sensor electrodes by a pen signal transmitted from a pen tip electrode disposed at a tip of the pen, and includes a conductive resin that covers an effective area formed by the plurality of sensor electrodes for detection of the position of the pen and that includes a substantially uniform resistance component at least within a range of the effective area. The cover film is arranged, without via a cover glass, on an upper surface of a sensor electrode group including the plurality of sensor electrodes.

A pen sensor according to the present disclosure is connected to a sensor controller that, in operation, detects an active pen that, in operation, transmits a pen signal from a pen tip electrode, and includes a plurality of sensor electrodes each connected to the sensor controller, and a cover film that covers an effective area formed by the plurality of sensor electrodes for detection of a position of the pen, that has conductivity, and that includes a substantially uniform resistance component at least within a range of the effective area. The cover film is arranged, without via a cover glass, on an upper surface of a sensor electrode group including the plurality of sensor electrodes.

Advantageous Effects

According to the present disclosure, the cover film for a pen sensor includes the conductive resin including the substantially uniform resistance component at least within the range of the effective area. Therefore, even when the cover film that is thinner and has a smaller relative permittivity than a cover glass is used, the pen signal can be received sufficiently at peripheral sensor electrodes.

BRIEF DESCRIPTION OF THE SEVERAL VIEWS OF THE DRAWINGS

FIG. 1A is a diagram illustrating a configuration of an electronic device 1 according to an embodiment of the present disclosure, while

FIGS. 3 and 3B are diagrams for describing the reason why signal levels at peripheral sensor electrodes decrease due to a small thickness or relative permittivity of a cover film 5; FIG. 3A illustrates the case where the cover film 5 has a relatively large thickness $D_A$ and a relatively large relative permittivity $\varepsilon_A$, while FIG. 3B illustrates the case where the cover film 5 has a relatively small thickness $D_B$ and a relatively small relative permittivity $\varepsilon_B$.

FIG. 4A illustrates the case where the cover film 5 has the relatively large thickness $D_A$, while FIG. 4V illustrates the case where the cover film 5 has the relatively small thickness $D_B$.

FIG. 7A is a schematic diagram illustrating the distribution of signal levels of a pen signal when the conductivity of the cover film 5 is relatively high, while

FIG. 8A is a diagram illustrating an example of a configuration of an electronic device including a pen sensor according to the background art, while

DETAILED DESCRIPTION

Hereinafter, an embodiment of the present disclosure is described in detail with reference to the accompanying drawings.

Figure 1A:
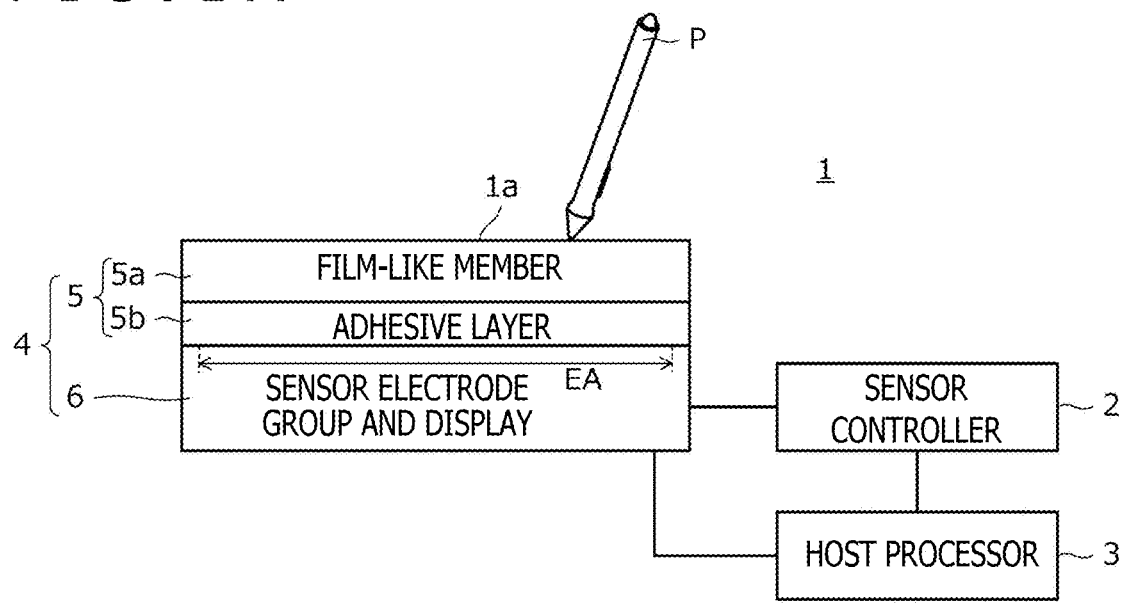

FIG. 1A is a diagram illustrating a configuration of an electronic device 1 according to an embodiment of the present disclosure. The electronic device 1 is, for example, a device such as a tablet computer that supports pen input and finger touch input, and includes a sensor controller 2, a host processor 3, and a pen sensor 4 as illustrated in FIG. 1A. In one or more implementations, the sensor controller 2 includes a processor and a memory storing instructions that, when executed by the processor, cause the sensor controller 2 to perform the acts described herein.

FIG. 1A also illustrates an active pen P, which performs pen input into the electronic device 1. The active pen P is a stylus supporting an active capacitive method and is configured to be able to communicate bidirectionally with the sensor controller 2 or to transmit a pen signal unidirectionally to the sensor controller 2. Although an example in which the active pen P and the sensor controller 2 communicate bidirectionally with each other is described in the present embodiment, the present disclosure is similarly applicable to an example in which the active pen P unidirectionally transmits the pen signal to the sensor controller 2. A user performs pen input by operating the active pen P on a panel surface 1a, which is disposed on the electronic device 1, and performs finger touch input by sliding a finger on the panel surface 1a.

The host processor 3 is a processor that controls the entire electronic device 1, and an operation of each unit in the electronic device 1 to be described later is performed under the control of the host processor 3. The sensor controller 2 is an integrated circuit that uses a sensor electrode group (described later) in the pen sensor 4 to derive the position of an indicator such as the active pen P or a user's finger within the panel surface 1a and to receive data transmitted from the active pen P. The sensor controller 2 is configured to sequentially output the derived position and data received from the active pen P to the host processor 3. The host processor 3 generates and draws digital ink in reference to the position and data input in this way.

The pen sensor 4 is a member having a structure in which a cover film 5 and a sensor electrode group and display 6 adhere to each other. The cover film 5 is a member including a film-like member 5a and an adhesive layer 5b, which are both transparent. The cover film 5 is disposed in such a manner as to cover at least an effective area EA (described later) of the sensor electrode group and display 6. The film-like member 5a is a film-like member that protects the sensor electrode group and display 6 and that constitutes the panel surface 1a. The adhesive layer 5b serves to adhere the film-like member 5a to an upper surface of the sensor electrode group and display 6.

Figure 8B:
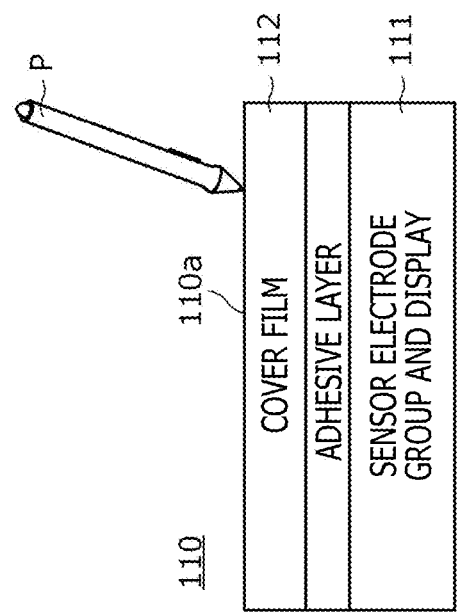
FIG. 8B is a diagram illustrating another example of the configuration of the electronic device including the pen sensor according to the background art.
Figure 8A:
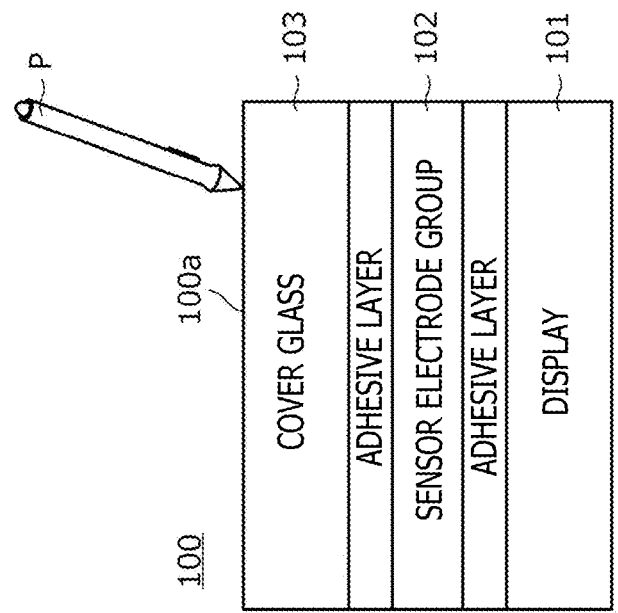
Figure 9:
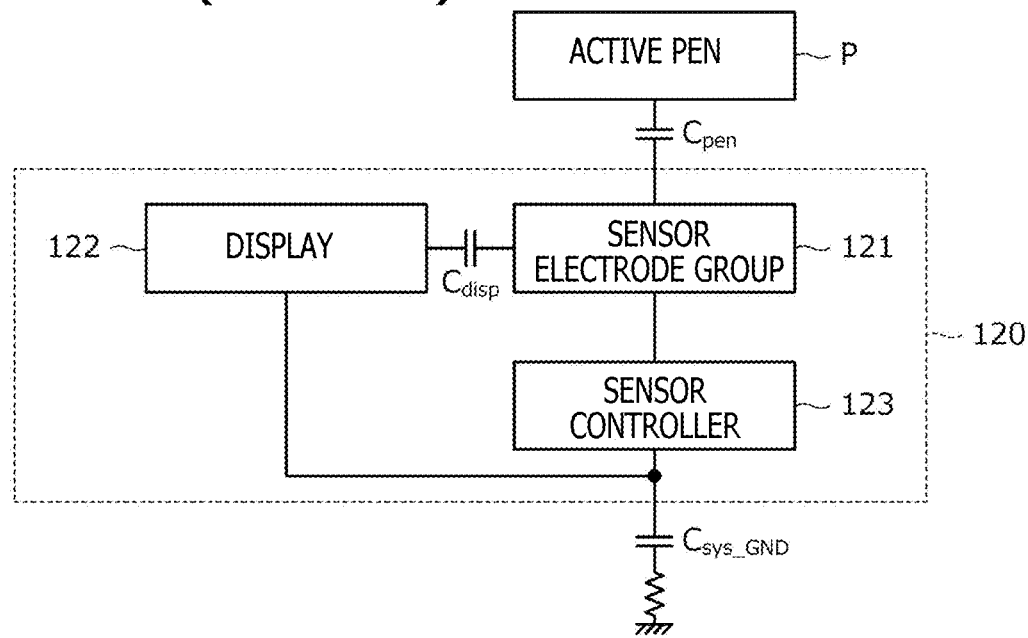
FIG. 9 is a diagram illustrating equivalent circuits of an electronic device and an active pen according to the background art.

The sensor electrode group and display 6 is a device in which the sensor electrode group for detecting the active pen and an electrode group (pixel electrodes and common electrodes) constituting a display are integrated with each other. As the sensor electrode group and display 6, an in-cell type in which the common electrodes are also used as part of the sensor electrode group and an on-cell type in which the sensor electrode group and the electrode group constituting the display are electrically separated from each other are available. In the present embodiment, the description continues, assuming that the sensor electrode group and display 6 is of the in-cell type. However, the present disclosure can also be applied to the case where the sensor electrode group and display 6 is of the on-cell type and the case where the sensor electrode group and the display are separate devices as illustrated in FIG. 8A. Further, various displays such as a liquid crystal display or an organic EL display can be used as the display constituting the sensor electrode group and display 6. In the present embodiment, the description continues, assuming that a TFT (Thin Film Transistor) type liquid crystal display is used as the display constituting the sensor electrode group and display 6.

Figure 1B:
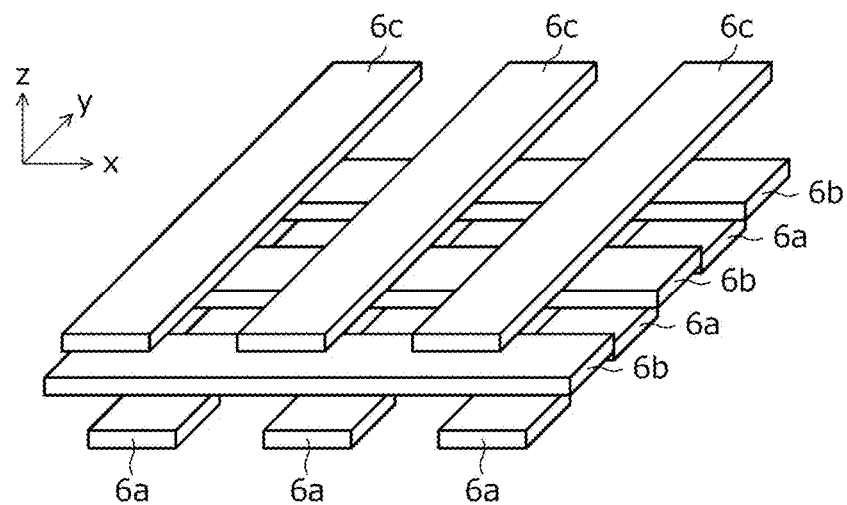
FIG. 1B is a schematic view illustrating a positional relation among three types of electrode groups 6*a*, 6*b*, and 6*c* included in a sensor electrode group and display 6 illustrated in FIG. 1A.

FIG. 1B is a schematic view illustrating a positional relation among three types of electrode groups 6a, 6b, and 6c included in the sensor electrode group and display 6. As illustrated in FIG. 1B, the sensor electrode group and display 6 includes the three types of electrode groups 6a, 6b, and 6c, which are stacked in a z-direction illustrated. Although the actual sensor electrode group and display 6 includes various members such as a liquid crystal layer in addition to the electrode groups 6a, 6b, and 6c, they are omitted in FIG. 1B.

The electrode group 6a, which is positioned in the lowermost layer, includes the pixel electrodes that constitute the TFT liquid crystal display and has a configuration in which a plurality of island-like conductors are arranged in a matrix in x- and y-directions. The electrode group 6b, which is positioned in the middle, includes the common electrodes that constitute the display and that also constitute part of the sensor electrode group. The electrode group 6b has a configuration in which a plurality of linear conductors each extending in the x-direction are arranged side by side in parallel in the y-direction at regular intervals. The electrode group 6c, which is positioned in the uppermost layer, constitutes the remainder of the sensor electrode group and has a configuration in which a plurality of linear conductors each extending in the y-direction are arranged side by side in parallel in the x-direction at regular intervals. It is noted that, although nine island-like conductors constituting the electrode group 6a, three linear conductors constituting the electrode group 6b, and three linear conductors constituting the electrode group 6c are each illustrated in FIG. 1B, each of the actual electrode groups 6a, 6b, and 6c includes more conductors. Hereinafter, the linear conductors constituting the electrode groups 6b and 6c are simply referred to as "sensor electrodes." Each sensor electrode includes a metal mesh or a substantially transparent linear conductor such as ITO.

When the sensor electrode group and display 6 is controlled as the display, the host processor 3 performs a process of supplying a common potential to each sensor electrode constituting the electrode group 6b and also supplying a potential corresponding to display content to each island-like conductor constituting the electrode group 6a. By contrast, when the sensor electrode group and display 6 is controlled as the sensor electrode group, the sensor controller 2 uses the electrode groups 6b and 6c to derive the position of the indicator within the panel surface 1a and to receive data transmitted from the active pen P. In this way, since the electrode group 6b is used in both the case where the sensor electrode group and display 6 is controlled as the display and the case where the sensor electrode group and display 6 is controlled as the sensor electrode group, the host processor 3 and the sensor controller 2 are configured to perform each control in a time-division manner.

An overview of processes performed by the sensor controller 2 with use of the electrode groups 6b and 6c is described. First, as to the detection of the active pen P, the sensor controller 2 uses one or both of the electrode groups 6b and 6c to periodically transmit an uplink signal. The uplink signal is a signal that serves to synchronize the active pen P with the sensor controller 2 and also transmit a command for controlling an operation of the active pen P. Next, the sensor controller 2 receives the pen signal transmitted from the active pen P in response to reception of the uplink signal. The pen signal is a signal transmitted from a pen tip electrode disposed at a tip of the active pen P and includes a position signal and a data signal. The position signal is an unmodulated carrier wave signal. The data signal is a carrier wave signal modulated by data instructed to be transmitted by the command.

The sensor controller 2 receives the pen signal by a method (differential method) using a differential amplification circuit described in Patent Document 2. This achieves an effect of reducing external noise that may be included in the received pen signal. Further, in receiving the pen signal by using the differential method, the sensor controller 2 simultaneously connects a plurality of adjacent sensor electrodes to each of a non-inverting input terminal and an inverting input terminal of the differential amplification circuit. With this configuration, it is possible to stabilize the reception result of the pen signal.

The sensor controller 2 detects the position of the active pen P on the panel surface 1a in reference to the distribution of signal levels each corresponding to the amount of electric charge induced in an individual one of the sensor electrodes constituting the electrode groups 6b and 6c by the position signal. Details of this detection are described later with reference to FIG. 2. Further, the sensor controller 2 receives data transmitted from the active pen P, by receiving and demodulating the data signal with use of a sensor electrode closest to the detected position among the sensor electrodes constituting the electrode groups 6b and 6c.

The effective area EA illustrated in FIG. 1A indicates a range in which the position detection of the active pen P by the sensor controller 2 is effectively performed. As described above, the sensor controller 2 performs the position detection based on the distribution of the signal levels each corresponding to the amount of electric charge induced in an individual sensor electrode. However, when a pen tip of the active pen P is positioned in a peripheral edge portion of the electrode groups 6b and 6c, no sensor electrode is present on one side of the pen tip. Hence, the sensor controller 2 cannot correctly derive the position of the active pen P. Within a planar region in which the sensor electrode group and display 6 is disposed, the effective area EA is a portion excluding an area where the sensor controller 2 cannot correctly derive the position of the active pen P due to such a reason. The sensor controller 2 is configured such that, even if a position outside the effective area EA is derived, the sensor controller 2 does not output the position to the host processor 3.

Further, as to the finger detection, the sensor controller 2 detects the position of a finger by repetitively performing, for each sensor electrode, a process of supplying a finger touch drive signal to a sensor electrode constituting one of the electrode groups 6b and 6c and receiving the finger touch drive signal by a sensor electrode constituting the other. The detection of the active pen P and the detection of a finger are performed by the sensor controller 2 in a time division manner during a time period in which the sensor electrode group and display 6 is controlled as the sensor electrode group.

Figure 2:
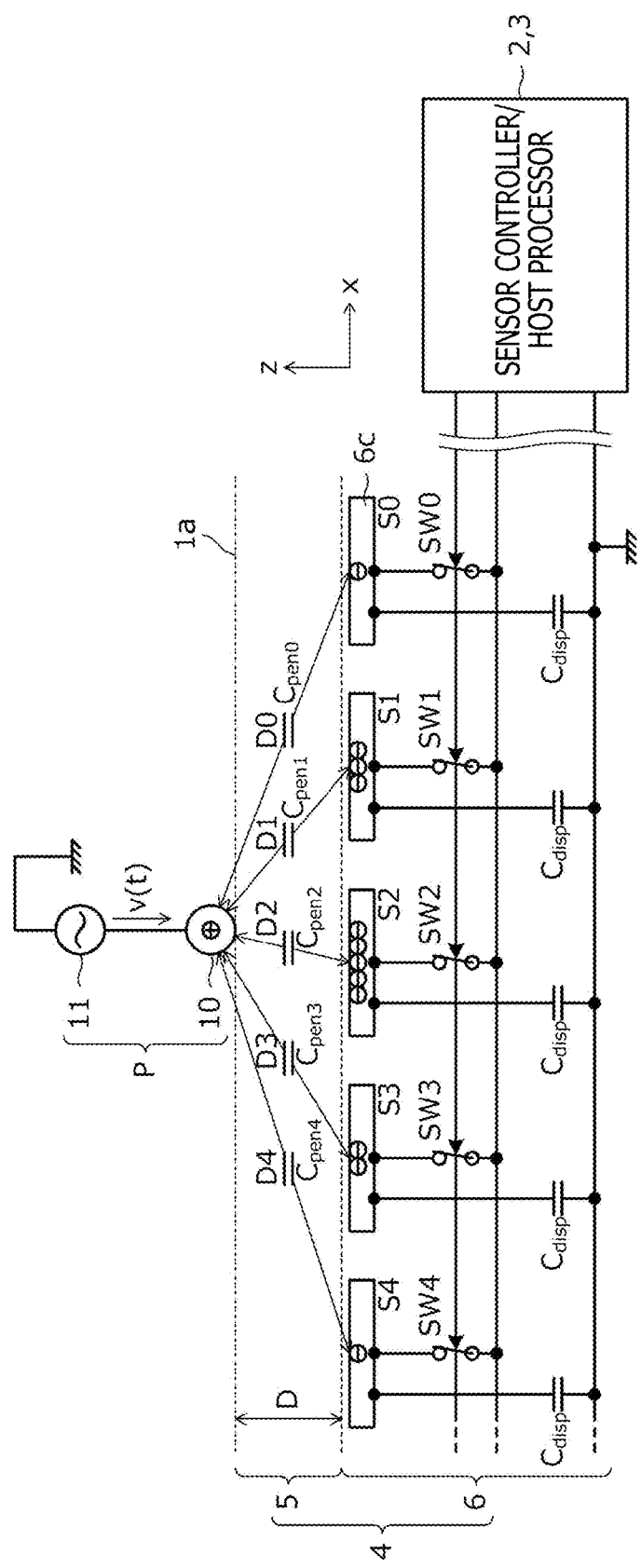
FIG. 2 is a diagram for describing the principle of detection of the position of an active pen P in the electronic device 1.

FIG. 2 is a diagram for describing the principle of detection of the position of the active pen P in the electronic device 1. Hereinafter, the position detection of the active pen P by the sensor controller 2 is described in detail, particularly from the viewpoint of a relation with the cover film 5, with reference to FIG. 2. It is noted that, although FIG. 2 illustrates the case where the x-coordinate of the active pen P is detected using the electrode group 6c, this similarly applies to the case where the y-coordinate of the active pen P is detected using the electrode group 6b.

First, the active pen P includes a pen tip electrode 10, which is disposed on the pen tip, and an oscillation circuit 11. The oscillation circuit 11 serves to transmit the pen signal from the pen tip electrode 10 by supplying an alternating-current voltage v(t) to the pen tip electrode 10.

Each of sensor electrodes S0 to S4 illustrated in FIG. 2 is a sensor electrode constituting the electrode group 6c. Further, each of distances D0 to D4 represents the distance between the pen tip electrode 10 and a corresponding one of the sensor electrodes S0 to S4, and each of capacitances $C_{pen0}$ to $C_{pen4}$ represents a capacitance formed between the pen tip electrode 10 and a corresponding one of the sensor electrodes S0 to S4. Each of capacitances $C_{disp}$ is a parasitic capacitance formed between each of the sensor electrodes S0 to S4 and the electrode groups 6a and 6b. As illustrated, each of the sensor electrodes S0 to S4 is connected, via a corresponding one of switch elements SW0 to SW4, to common lines connected to the sensor controller 2. The sensor controller 2 is configured to be individually connectable to each of the sensor electrodes S0 to S4 via the common lines by individually controlling the switch elements SW0 to SW4.

Assuming that the alternating-current voltage v(t) generated by the oscillation circuit 11 is positive (positive as viewed from a ground terminal of the electronic device 1) at a certain time t, negative electric charges corresponding to the reciprocals of the individual distances D0 to D4 are induced in the respective sensor electrodes S0 to S4. More precisely, the negative electric charges each having the amount inversely proportional to the square of a corresponding one of the distances D0 to D4 are induced. The sensor controller 2 measures the amount of electric charge (or current or voltage) induced in each of the sensor electrodes S0 to S4 in this way and obtains the result as the signal level at the x-coordinate (known position) of each of the sensor electrodes S0 to S4. This similarly applies to the case where the alternating-current voltage v(t) is negative or 0.

Subsequently, the sensor controller 2 approximates the signal levels obtained at respective x-coordinates, by using a predetermined interpolation function. Specifically, the sensor controller 2 determines a coefficient of the predetermined interpolation function such that the sum of squares of residuals is minimized. As the predetermined interpolation function, for example, an upward-projecting quadratic function can preferably be used. The sensor controller 2 further derives the x-coordinate of the vertex of the interpolation function indicated by the determined coefficient and obtains the derived x-coordinate as the x-coordinate of the active pen P. By using such a derivation method, the sensor controller 2 can output the x-coordinate of the active pen P with finer resolution than the widths and pitches of the sensor electrodes S0 to S4.

Here, if the thickness and relative permittivity of the cover film 5 are small, there is a possibility that the signal levels at sensor electrodes (peripheral sensor electrodes) located near a sensor electrode (central sensor electrode) located immediately below the pen tip electrode 10 decrease and the position of the active pen P cannot be derived correctly. Further, if the thickness of the cover film 5 is small, there is a possibility that a line corresponding to the user's operation cannot be drawn. Each is described in detail below.

Figure 3A:
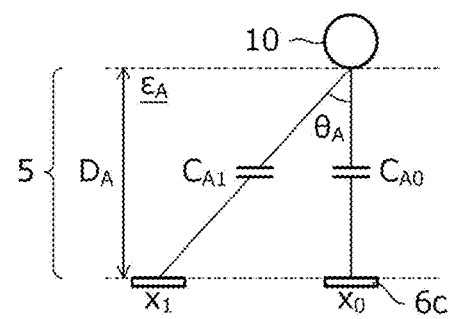
Figure 3B:
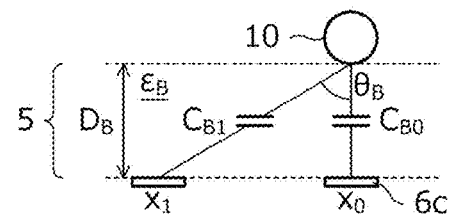

FIGS. 3A and 3B are diagrams for describing the reason why the signal levels at the peripheral sensor electrodes decrease due to the small thickness and relative permittivity of the cover film 5. FIG. 3A illustrates the case where the cover film 5 has a relatively large thickness $D_A$ and a relatively large relative permittivity $\varepsilon_A$. FIG. 3B illustrates the case where the cover film 5 has a relatively small thickness $D_B$ and a relatively small relative permittivity $\varepsilon_B$.

A coordinate $x_0$ illustrated in FIGS. 3A and 3B represents the position of a central sensor electrode, and the coordinate $x_1$ represents the position of a peripheral sensor electrode. Further, in the examples of FIGS. 3A and 3B, each of angles $\theta_A$ and $\theta_B$ represents the angle formed between lines connecting a lower end of the pen tip electrode 10 and the respective positions of the central sensor electrode and the peripheral sensor electrode. In the examples of FIGS. 3A and 3B, each of capacitances $C_{A0}$ and $C_{B0}$ represents a capacitance formed between the pen tip electrode 10 and the central sensor electrode. In the examples of FIGS. 3A and 3B, each of capacitances $C_{A1}$ and $C_{B1}$ represents a capacitance formed between the pen tip electrode 10 and the peripheral sensor electrode.

Specific values of the capacitances $C_{A0}$, $C_{A1}$, $C_{B0}$, and $C_{B1}$ are respectively expressed by the following formulas (1) to (4). It is noted that an area S is the area (common to each capacitance) of the conductor constituting each capacitance.

[Math. 1]

$$C_{A0} = \epsilon_A \frac{S}{D_A} \quad (1)$$

$$C_{A1} = \epsilon_A \frac{S}{D_A} \cos\theta_A \quad (2)$$

$$C_{B0} = \epsilon_B \frac{S}{D_B} \quad (3)$$

$$C_{B1} = \epsilon_B \frac{S}{D_B} \cos\theta_B \quad (4)$$

From the formulas (1) and (2), the ratio $C_{A1}/C_{A0}$ between the capacitance $C_{A0}$ and the capacitance $C_{A1}$ is $\cos\theta_A$. Similarly, from the formulas (3) and (4), the ratio $C_{B1}/C_{B0}$ between the capacitance $C_{B0}$ and the capacitance $C_{B1}$ is $\cos\theta_B$. As is clear from FIGS. 3A and 3B, $\cos\theta_B > \cos\theta_A$. Accordingly, $C_{B1}/C_{B0}$ is smaller than $C_{A1}/C_{A0}$. Hence, in the example of FIG. 3B, compared with the example of FIG. 3A, the signal level of the peripheral sensor electrode in comparison with the signal level of the central sensor electrode decreases relatively. Further, as understood from the formulas (1) to (4), the fact that $\epsilon_B < \epsilon_A$ is a factor that decreases the signal levels as a whole in the example of FIG. 3B.

In addition to these decreasing factors, the use of the sensor electrode group and display 6 is also a factor that decreases the signal levels as a whole. The reason is that, when the sensor electrode group and display 6 is used, the capacitance $C_{disp}$ (see FIG. 2) increases compared with the case where, for example, the sensor electrode group and the display are prepared as separate devices as in the example illustrated in FIG. 8A and, as a result, a display noise flowing into the sensor controller 2 increases, deteriorating the S/N ratio of the pen signal.

If the signal levels at peripheral sensor electrodes decrease in this way, AD (Analog-to-Digital) conversion that maintains accuracy over a wide dynamic range is required in order to receive the pen signal. This makes it practically difficult to receive the pen signal at the peripheral sensor electrodes. Hence, even if the thickness and the relative permittivity of the cover film 5 are small, it is necessary to sufficiently receive the pen signal at the peripheral sensor electrodes. It is noted that, although the description so far has focused on the x-coordinate, this similarly applies to the y-coordinate.

Figure 4A:
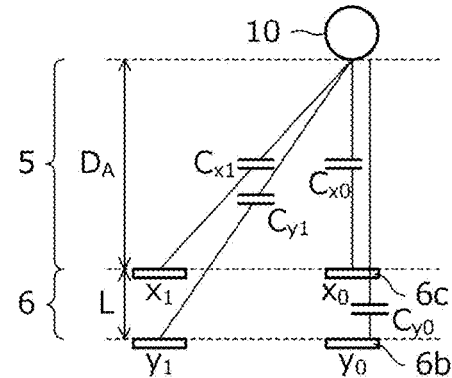
FIGS. 4A and 4B are diagrams for describing the reason why a line corresponding to a user's operation cannot be drawn due to a small thickness of the cover film 5.
Figure 4B:
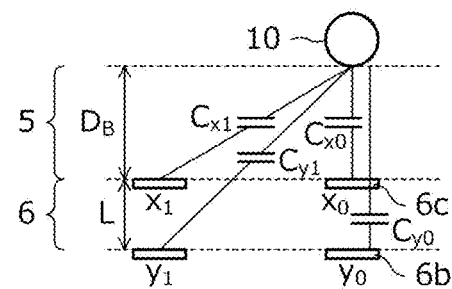

FIGS. 4A and 4B are diagrams for describing the reason why a line corresponding to the user's operation cannot be drawn due to the small thickness of the cover film 5. FIG. 4A illustrates the case where the cover film 5 has the relatively large thickness $D_A$. FIG. 4B illustrates the case where the cover film 5 has the relatively small thickness $D_B$.

A coordinate $x_0$ illustrated in FIGS. 4A and 4B represents the position of a central sensor electrode included in the electrode group 6c. A coordinate $x_1$ represents the position of a peripheral sensor electrode included in the electrode group 6c. Further, a coordinate $y_0$ illustrated in FIG. 4 represents the position of a central sensor electrode included in the electrode group 6b. A coordinate $y_1$ represents the position of a peripheral sensor electrode included in the electrode group 6b. It is noted that although the sensor electrodes constituting the electrode group 6c and the sensor electrodes constituting the electrode group 6b are depicted as extending in the same direction in FIGS. 4A and 4B, these figures are to facilitate understanding of the following description. In actual implementation, as illustrated in FIG. 1B, the sensor electrodes constituting the electrode group 6c and the sensor electrodes constituting the electrode group 6b extend in directions perpendicular to each other.

Capacitances $C_{x0}$, $C_{y0}$, $C_{x1}$, and $C_{y1}$ illustrated in FIGS. 4A and 4B each represent capacitances formed between the lower end of the pen tip electrode 10 and the sensor electrodes positioned at the respective coordinates $x_0$, $y_0$, $x_1$, and $y_1$. Specific values of the capacitances $C_{x0}$, $C_{y0}$, $C_{x1}$, and $C_{y1}$ are expressed by the following formulas (5) to (8), respectively. It is noted that an angle $\theta_x$ is the angle formed between lines connecting the lower end of the pen tip electrode 10 and the respective positions of the central sensor electrode and the peripheral sensor electrode of the electrode group 6c. An angle $\theta_y$ is the angle formed between lines connecting the lower end of the pen tip electrode 10 and the respective positions of the central sensor electrode and the peripheral sensor electrode of the electrode group 6b. Further, relative permittivity $\epsilon$ is the relative permittivity of the cover film 5, and a thickness D is the thickness of the cover film 5 (D=$D_A$ in FIG. 4A, and D=$D_B$ in FIG. 4B). A distance L is the separation distance between the electrode group 6c and the electrode group 6b in the z-direction. An area S is the area (common to each capacitance) of the conductor constituting each capacitance. It is noted that the permittivity between the electrode group 6c and the electrode group 6b is ignored in the formulas (5) to (8).

[Math. 2]

$$C_{x0} = \epsilon \frac{S}{D} \quad (5)$$

$$C_{x1} = \epsilon \frac{S}{D} \cos\theta_x \quad (6)$$

$$C_{y0} = \epsilon \frac{S}{D+L} \quad (7)$$

$$C_{y1} = \epsilon \frac{S}{D+L} \cos\theta_y \quad (8)$$

From the formulas (5) to (8), it is understood that $C_{x1}/C_{x0}$ is equal to $\cos\theta_x$ and $C_{y1}/C_{y0}$ is equal to $\cos\theta_y$. Here, the angle $\theta_x$ and the angle $\theta_y$ take different values regardless of the thickness D of the cover film 5 because the electrode group 6c and the electrode group 6b are separated from each other in the z-direction. If the angle $\theta_x$ and the angle $\theta_y$ are different from each other, $\cos\theta_x$ and $\cos\theta_y$ are different from each other. Accordingly, $C_{x1}/C_{x0}$ and $C_{y1}/C_{y0}$ are different from each other. However, the fact that $C_{x1}/C_{x0}$ and $C_{y1}/C_{y0}$ are different from each other means that the distribution of the signal levels in the x-direction and the distribution of the signal levels in the y-direction are different from each other. Even if the distribution of the signal levels in the x-direction and the distribution of the signal levels in the y-direction are different from each other, no particular problem occurs as long as the difference is small. However, as the difference becomes large, it becomes difficult to draw a line corresponding to the user's operation.

As understood from FIGS. 4A and 4B, the difference between the distance between the pen tip electrode 10 and the electrode group 6c and the distance between the pen tip electrode 10 and the electrode group 6b becomes larger as the thickness D of the cover film 5 becomes smaller. This means that the smaller the thickness D of the cover film 5, the larger the difference between the angle $\theta_x$ and the angle $\theta_y$. Accordingly, the smaller the thickness D of the cover film 5, the larger the difference between the distribution of the signal levels in the x-direction and the distribution of the signal levels in the y-direction. In this case, as described above, it becomes difficult to draw a line corresponding to the user's operation.

Figure 5:
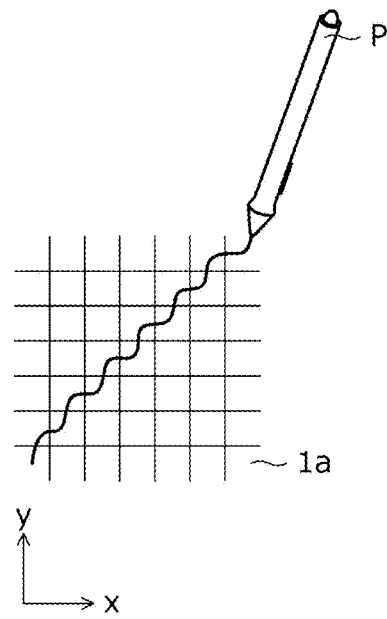
FIG. 5 is a view illustrating a wavy line that may be generated in the example of FIG. 4B.

FIG. 5 is a view illustrating a wavy line that may be generated in the example of FIG. 4B. As a result of the large difference between the distribution of the signal levels in the x-direction and the distribution of the signal levels in the y-direction, the wavy line depicted by a thick line in this example represents a line drawn by the electronic device 1 although the user has moved the active pen P linearly. Since drawing a line that is different from that intended by the user's operation in this way is of course undesirable, it is necessary to draw a line corresponding to the user's operation even if the thickness of the cover film 5 is small.

Return to FIGS. 1A and 1B. In order to solve the above-described problems, the cover film 5 according to the present embodiment includes a conductive resin including a substantially uniform resistance component at least within the range of the effective area EA illustrated in FIG. 1A. It is noted that "substantially uniform" means that there is uniformity to the extent that the accuracy of the position of the active pen P does not significantly decrease due to variation in the resistance component. Effects obtained by employing such a configuration are described in detail below with reference to FIG. 6.

Figure 6:
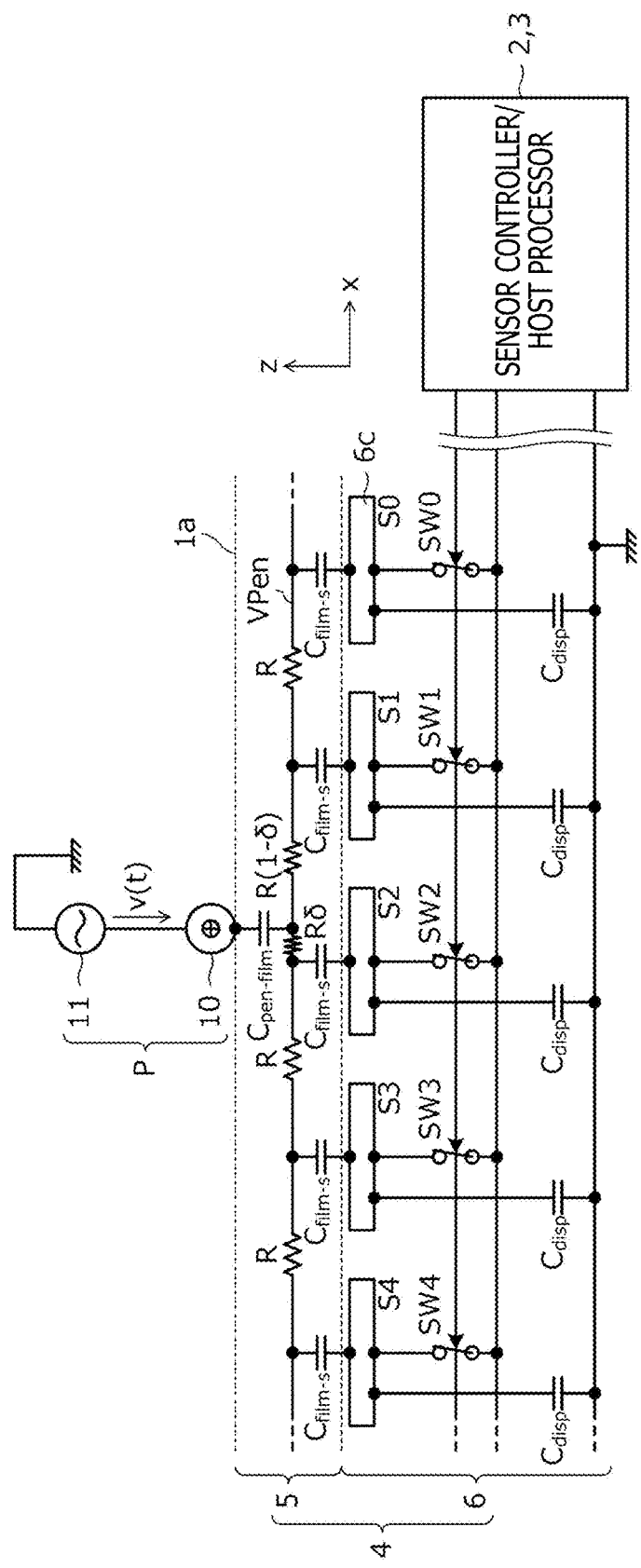
FIG. 6 is a diagram illustrating equivalent circuits of the electronic device 1 and the active pen P.

FIG. 6 is a diagram illustrating equivalent circuits of the electronic device 1 and the active pen P. The difference from the principle diagram illustrated in FIG. 2 is that the conductive resin in the cover film 5 functions as a virtual pen electrode VPen. A capacitance $C_{pen}$ film is formed between the virtual pen electrode VPen and the pen tip electrode 10. Further, a capacitance $C_{film-s}$ is formed between the virtual pen electrode VPen and each of the sensor electrodes S0 to S4. Hence, an alternating-current circuit is formed from the pen tip electrode 10 to the sensor controller 2 through the capacitance $C_{pen}$ film, the virtual pen electrode VPen, the capacitances $C_{film-s}$, and each of the sensor electrodes S0 to S4.

When the pen tip electrode 10 approaches the panel surface 1a, the virtual pen electrode VPen and the conductive resin form a flow path of the pen signal (alternating-current voltage v(t)) that is inclined with a distribution that spreads around the position of the pen tip electrode 10. Then, the levels of the pen signal in this flow path are detected as the signal levels by the sensor controller 2 via the capacitances $C_{film-s}$. Accordingly, the signal levels at the peripheral sensor electrodes increase. Hence, with the cover film 5 according to the present embodiment, the pen signal can sufficiently be received even at the peripheral sensor electrodes. Further, the difference between the distribution of the signal levels in the x-direction and the distribution of the signal levels in the y-direction is suppressed. Therefore, with the cover film 5 according to the present embodiment, it is possible to draw a line corresponding to the user's operation even if the thickness of the cover film 5 is small.

Return to FIGS. 1A and 1B. As described above, the cover film 5 includes the film-like member 5a and the adhesive layer 5b. However, the conductive resin in the cover film 5 may be formed by a conductive material being mixed into a resin material included in the film-like member 5a or may be formed by a conductive adhesive being used as the adhesive layer 5b. The conductive resin in the cover film 5 is configured not to include any electrical contact point other than the capacitance formed between the conductive resin and the pen tip electrode 10 and the capacitance formed between the conductive resin and each sensor electrode.

Here, it is not enough that the conductivity of the cover film 5 is high. For example, if the cover film 5 is a complete conductor, the pen signal is shielded and does not reach the electrode groups 6b and 6c. In this case, not only the peripheral sensor electrodes but also the central sensor electrode cannot receive the pen signal. Further, even if the cover film 5 is not a complete conductor, too high conductivity spreads the distribution of the signal levels greatly, decreasing the accuracy of the position derivation by the sensor controller 2.

Figure 7A:
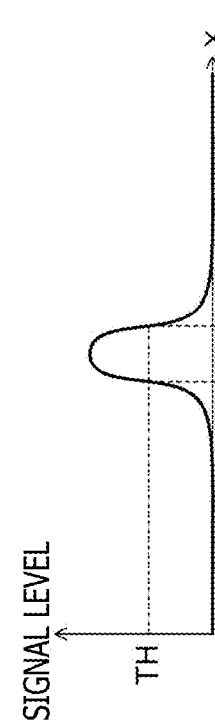
Figure 7A:
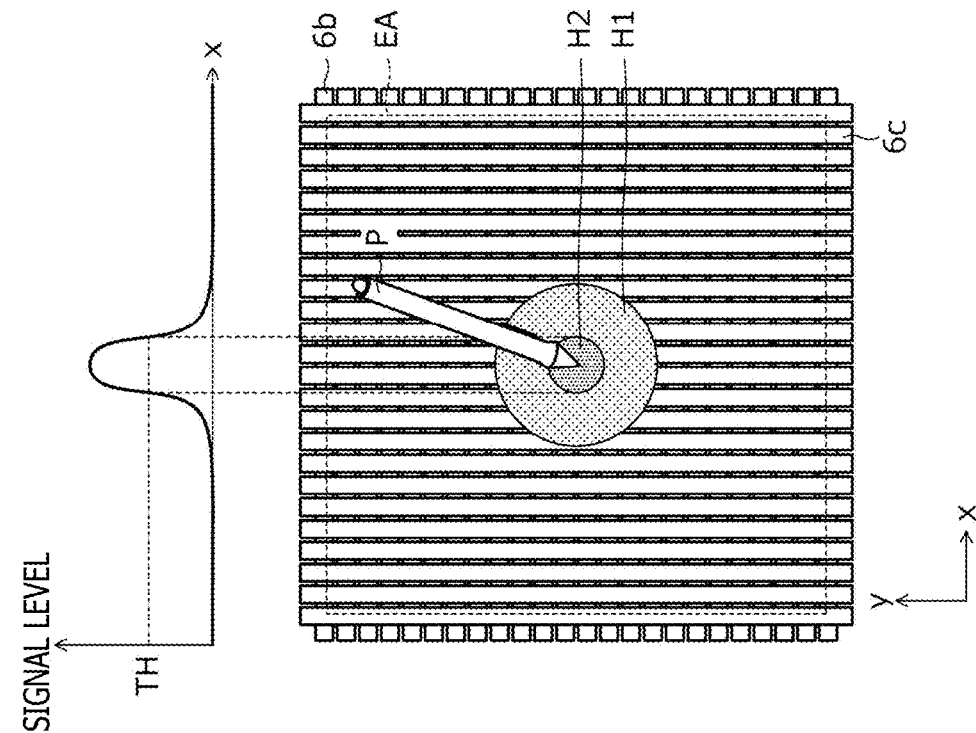
Figure 7B:
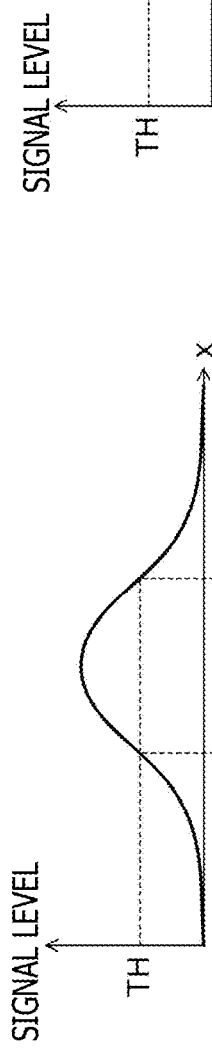
FIG. 7B is a schematic diagram illustrating the distribution of signal levels of the pen signal when the conductivity of the cover film 5 is relatively low.
Figure 7B:
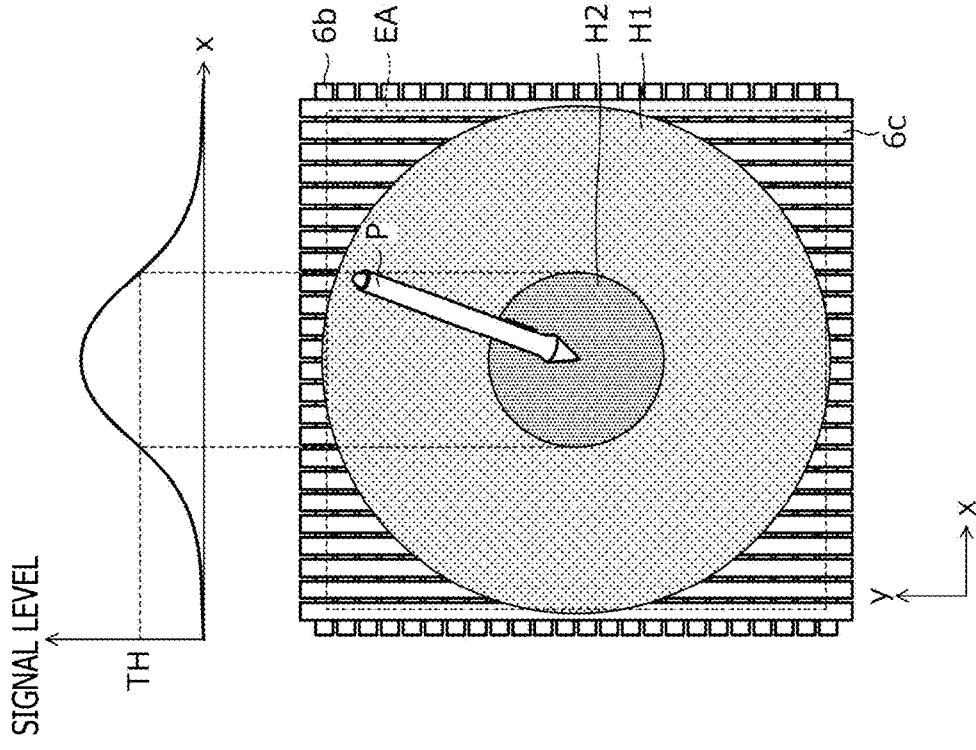

FIG. 7A is a schematic diagram illustrating the distribution of the signal levels of the pen signal when the conductivity of the cover film 5 is relatively high. FIG. 7B is a schematic diagram illustrating the distribution of the signal levels of the pen signal when the conductivity of the cover film 5 is relatively low. In these figures, a circular region H1 represents a region where the pen signal is detected by the sensor controller 2, and a circular region H2 represents a region, within the region H1, where the detected signal levels are equal to or less than a predetermined value TH. The sensor controller 2 performs threshold determination for the signal levels to derive the position of the active pen P by using the signal levels included in the region H2. When the region H2 is too large as illustrated in FIG. 7A, the distribution of the signal levels becomes gradual. Accordingly, the accuracy of the position derivation decreases. Further, the sensor controller 2 receives the pen signal by the differential method as described above. Hence, when the distribution of the signal levels becomes gradual, the signal is canceled between the sensor electrodes, and as a result, there is a possibility that the pen signal cannot be received. However, as described above, the sensor controller 2 performs a process of simultaneously connecting the plurality of sensor electrodes to each of the non-inverting input terminal and the inverting input terminal of the differential amplification circuit. If the region H2 is too small, it becomes difficult to achieve the effect of this simultaneous connection (the effect of stabilizing the reception result of the pen signal). Therefore, in order to reliably receive the pen signal while deriving the position with high accuracy and stabilizing the reception result, the region H2 needs to be neither too wide nor too narrow and needs to be kept in a reasonable size, as illustrated in FIG. 7B.

In order to keep the region H2 in an appropriate size while allowing the pen signal to sufficiently be received at the peripheral sensor electrodes, it suffices that a sheet resistance value (surface resistance value) of the resistance component of the cover film 5 is set within an appropriate range. Here, the sheet resistance value is a value obtained by dividing the resistivity of the cover film 5 by its thickness. Hence, setting the sheet resistance value within an appropriate range means that a resistance value per area of the cover film 5 is set within a certain range regardless of the thickness. With this configuration, the pen signal can be diffused to the electrode groups 6b and 6c superimposed on the lower side, regardless of whether the thickness of the cover film 5 is large or small.

A specific value of the sheet resistance value of the resistance component of the cover film 5 is preferably in the range of 1 k$\Omega$/sq or more but 1 G$\Omega$/sq or less. By setting the sheet resistance value of the cover film 5 to a value within this range, it is possible to keep the region H2 in an appropriate size while allowing the pen signal to sufficiently be received at the peripheral sensor electrodes.

Further, specifically, as the material (conductive resin) of the cover film 5 having such a sheet resistance value, a material including conductive polymer made of at least one of polyethylene dioxythiophene/polystyrene sulfonate (PEDOT/PSS) and polyaniline is preferably used. More preferably, a material including a metal material made of at least one of indium, gallium, and tin is used. The film-like member 5a may be formed of a conductive film described in any one of Patent Documents 4 to 8 and Non-Patent Document 1 described above. Further, the film-like member 5a may be formed by coating being performed on a non-conductive film with the conductive resin described in Non-Patent Document 2 described above. Moreover, the film-like member 5a may be formed of a conductive plastic formed using the technique described in Non-Patent Document 3.

As described above, with the cover film 5 and the pen sensor 4 according to the present embodiment, the cover film 5 includes a conductive resin having a substantially uniform resistance component at least within the range of the effective area EA. Accordingly, even if the cover film 5 that is thinner and has a lower relative permittivity than a cover glass is used, the pen signal can sufficiently be received at the peripheral sensor electrodes. Further, since it is possible to keep the distribution of the signal levels in an appropriate size, the position can be derived with high accuracy, and the reception result can be stabilized. Moreover, even if the thickness of the cover film 5 is small, it is possible to draw a line corresponding to the user's operation.

It is noted that at present, a conductive cover film is more expensive than a non-conductive cover glass or cover film. Hence, when a conductive cover film is employed, it is necessary to ensure that the effects of the disclosure are obtained by keeping the sheet resistance value of the resistance component of the cover film 5 within the above-described range. Conversely, those skilled in the art who do not know that the effects of the present disclosure can be obtained by keeping the sheet resistance value within the above-described range would not consider using a conductive film as a cover film for a pen sensor.

Further, if the cover film has conductivity, the accuracy of detecting the position of a finger decreases even though it is good for detecting the position of the active pen P. This is because the signal level of the finger touch drive signal described above decreases. From this point of view as well, those skilled in the art who do not know that the effects of the present disclosure can be obtained would not consider using a conductive film as a cover film for a pen sensor. However, practically, as long as the thickness of the cover film 5 is 1 mm or less, a decrease in the signal level of the finger touch drive signal does not become a problem. Therefore, it is preferable to set the thickness of the cover film 5 to 1 mm or less.

Although the preferred embodiment of the present disclosure has been described above, the present disclosure is by no means limited to the above-described embodiment. As a matter of course, the present disclosure can be implemented in various modes without departing from the scope of the present disclosure.

DESCRIPTION OF REFERENCE SYMBOLS

1: Electronic device
1a: Panel surface
2: Sensor controller
3: Host processor
4: Pen sensor
5: Cover film
5a: Film-like member
5b: Adhesive layer
6: Sensor electrode group and display
6a: Electrode group
6b, 6c: Electrode group (sensor electrode)
10: Pen tip electrode
11: Oscillation circuit
EA: Effective area
P: Active pen
S0 to S4: Sensor electrode
VPen: Virtual pen electrode

The invention claimed is:

1. A cover film used together with a pen sensor including a plurality of sensor electrodes for detection of a pen position based on a pen signal, the cover film comprising:
a conductive material that includes a substantially uniform resistance component within a range of an effective area formed by the plurality of sensor electrodes.

2. The cover film for a pen sensor according to claim 1, wherein, when a pen electrode of a pen approaches the conductive material, the conductive material forms a flow path for the pen signal that is inclined with a distribution that spreads around a position of the pen electrode.

3. The cover film for a pen sensor according to claim 2, wherein levels of the pen signal in the flow path are detected as signal levels by a sensor controller that detects the pen position in reference to a distribution of the signal levels each corresponding to an amount of electric charge induced in an individual one of the plurality of sensor electrodes by the pen signal transmitted from the pen electrode, via capacitances formed between the conductive material and respective ones of the plurality of sensor electrodes.

4. The cover film for a pen sensor according to claim 2,
wherein the pen electrode is electrically connected to each of the plurality of sensor electrodes via a capacitance formed between the conductive material and each of the plurality of sensor electrodes, and
the conductive material does not include any electrical contact point other than a capacitance formed between the conductive material and the pen electrode and a capacitance formed between the conductive material and each of the plurality of sensor electrodes.

5. The cover film for a pen sensor according to claim 1, wherein a sheet resistance value of the substantially uniform resistance component is 1 kΩ/sq or more.

6. The cover film for a pen sensor according to claim 1, wherein a sheet resistance value of the substantially uniform resistance component is 1 GΩ/sq or less.

7. The cover film for a pen sensor according to claim 1, further comprising:
a film-like member; and
an adhesive layer adhering the film-like member and a sensor electrode group including the plurality of sensor electrodes,
wherein the conductive material includes the adhesive layer.

8. The cover film for a pen sensor according to claim 1, further comprising:
a film-like member including a material,
wherein the conductive material includes a conductive material mixed into the material.

9. The cover film for a pen sensor according to claim 1, wherein the conductive material includes a conductive polymer made of at least one of polyethylene dioxythiophene/ polystyrene sulfonate (PEDOT/PSS) or polyaniline.

10. The cover film for a pen sensor according to claim 1, wherein the conductive material includes a metal material made of at least one of indium, gallium, or tin.

11. The cover film for a pen sensor according to claim 1, which is arranged, without a cover glass, on an upper surface of a sensor electrode group including the plurality of sensor electrodes.

* * * * *